United States Patent
Aksit et al.

(10) Patent No.: US 6,533,284 B2
(45) Date of Patent: Mar. 18, 2003

(54) APPARATUS FOR COOLING BRUSH SEALS AND SEAL COMPONENTS

(75) Inventors: Mahmut Faruk Aksit, Troy, NY (US); Osman Saim Dinc, Troy, NY (US)

(73) Assignee: General Electric Company, Niskayuna, NY (US)

( * ) Notice: Subject to any disclaimer, the term of this patent is extended or adjusted under 35 U.S.C. 154(b) by 47 days.

(21) Appl. No.: 09/777,642

(22) Filed: Feb. 6, 2001

(65) Prior Publication Data
US 2002/0105145 A1 Aug. 8, 2002

(51) Int. Cl.[7] .............................. F01D 11/02; F16J 15/44
(52) U.S. Cl. ....................................................... 277/355
(58) Field of Search ......................................... 277/355

(56) References Cited

U.S. PATENT DOCUMENTS

| | | | |
|---|---|---|---|
| 5,076,590 A | * | 12/1991 | Steinetz et al. ............. 277/355 |
| 5,288,020 A | * | 2/1994 | Pirker |
| 5,302,426 A | * | 4/1994 | Stastny |
| 6,139,019 A | * | 10/2000 | Dinc et al. .................. 277/355 |
| 6,186,508 B1 | * | 2/2001 | Zajchowski et al. ........ 277/355 |

* cited by examiner

Primary Examiner—Lloyd A. Gall
Assistant Examiner—Enoch E Peavey
(74) Attorney, Agent, or Firm—Patrick K. Patndoe; Christian G. Cabou

(57) ABSTRACT

A brush seal is provided between a first stationary component and a second rotating component. A cooling medium is provided through a plurality of jet nozzles for flow along an upstream surface portion of the brush seal bristles and along the rotating component surface adjoining the tips of the bristles. The cooling medium cools the brush seal bristles to a temperature below the temperature of the working fluid passing through the turbine. The jet nozzles may be arranged in the shroud or in the upstream backing plate of the brush seal to direct the cooling medium toward the juncture of the brush seal and the sealing surface.

19 Claims, 3 Drawing Sheets

APPARATUS FOR COOLING BRUSH SEALS AND SEAL COMPONENTS

BACKGROUND OF THE INVENTION

This invention relates to brush seals for sealing between adjacent components and, more particularly, relates to brush seals for use in high temperature environments, such as between shrouds and bucket tips or covers in gas or steam turbines, and requiring cooling by a cooling medium.

Brush seals are increasingly being used in gas and steam turbine applications. In many instances, brush seals are being installed in lieu of, or in conjunction with, labyrinth-type seals, and at various locations in the apparatus. Brush seals are also being utilized at locations subjected to increasing temperatures and pressures. A typical brush seal comprises a plurality of elongated bristles formed of a ceramic or metal material disposed between one or more backing plates. The brush seal is conventionally fixed to one component, e.g., a fixed component, with the bristle tips projecting from the seal to engage another component, e.g., a rotatable shaft, to form a seal therewith.

Current brush seals however, cannot withstand operating environments in which the temperatures are above 1200° F. Application of brush seals to areas of the turbine having higher temperatures has thus been inhibited by this temperature limitation. For example, in hot gas path applications in gas turbines, such as bucket tip sealing, operating temperatures can be 1800° F. or higher. Consequently, there is a need for an improved brush seal for use in applications at high temperatures.

BRIEF SUMMARY OF THE INVENTION

In accordance with a preferred embodiment of the invention, a film-cooled high temperature brush seal is cooled by jets of a cooling medium injected adjacent the upstream side of the brush seal; that is, in one preferred embodiment, a thin film of cooling medium serving as a thermal insulator flows along upstream surfaces of the bristles and past the bristle pack to maintain temperature of the bristles below a predetermined temperature, for example, 1200° F. The cooling flow protects the bristles from the high temperature working fluid medium. A typical application of this preferred embodiment includes provision of a brush seal formed in the shroud surrounding bucket tip covers of a gas turbine. The buckets lie in the hot gas path with the bristles projecting from the shrouds for engagement with the rotating components, e.g., bucket tip covers. Nozzles are circumferentially spaced one from the other about the shrouds for flowing jets of a cooling medium in a generally radial direction to provide a thermal insulating film of the cooling medium on upstream surfaces of the brush seal bristles and along the rotating component, i.e., the bucket tip covers. In conjunction with a typical brush seal arrangement, i.e., a brush seal having a pair of backing plates on opposite sides of the bristle pack and with the upstream backing plate spaced from the bristle pack, a spacer or a flange between the upstream backing plate and the bristle pack is provided. The spacer or flange includes a plurality of circumferentially spaced nozzles to flow the cooling medium between the upstream backing plate and the upstream face of the bristle pack to reduce the temperature of the bristles to well below the temperature of the hot gas stream; that is, the nozzles provide a thin, thermally insulating film of cooling medium between the bristles and the hot gas path. Additionally, the cooling medium flows along the bucket tip covers, cooling the covers and buckets.

In another preferred embodiment of the invention, the nozzles are arranged upstream of the brush seal and open through the stationary component. For example, the nozzles may be arranged upstream of the upstream backing plate and open through the shroud. The nozzles preferably lie in communication with a plenum containing the cooling medium, e.g., air. The jets of air thus flow along the forward surface of the backing plate into the gap between the upstream backing plate and the rotating component, and form a thin-film layer along the upstream faces of the bristles adjacent their tips. The thin film of air then flows through the juncture of the bristle tips and the bucket covers. In another form, the nozzles may be angled from the shrouds to direct the jets of cooling medium directly at the juncture of the bristle tips and the rotating component. The nozzles may also be formed through the upstream backing plate such that the jets of cooling medium are angled or directed onto the juncture of the bristle tips and the rotating component.

In still another preferred embodiment of the invention, sealing apparatus comprises first and second components movable relative to one another and defining a gap therebetween for flowing a fluid medium at a high temperature, and a brush seal carried by the first component for disposition between the first component and the second component and sealing the gap between high and low pressure regions on respective opposite sides of the seal. The brush seal includes a plurality of projecting bristles having free ends terminating in bristle tips in engagement with the second component so as to form a seal between the components to minimize fluid flow from the high pressure region through the gap to the low pressure region, and means for forming a thin layer of cooling medium along a surface portion of the bristles to thermally insulate the bristles from the high temperature fluid medium.

In a further preferred embodiment of the invention, a rotary machine comprises a rotatable component and a component that is fixed against rotation, or stationary. The components are disposed about an axis, with a brush seal carried by one of the components including a plurality of bristles projecting from the one component and having free ends terminating in bristle tips in engagement with another of the components to minimize flow of a high temperature fluid from a high pressure region on one side of the brush seal to a low pressure region on an opposite side of the seal. A plurality of nozzles are carried by one component for directing a cooling medium toward a juncture of the bristle tips and the other component to form a layer of cooling medium adjacent a surface of the bristles on an upstream side thereof to thermally insulate the bristles from the fluid.

DETAILED DESCRIPTION OF THE INVENTION

Figure 1:
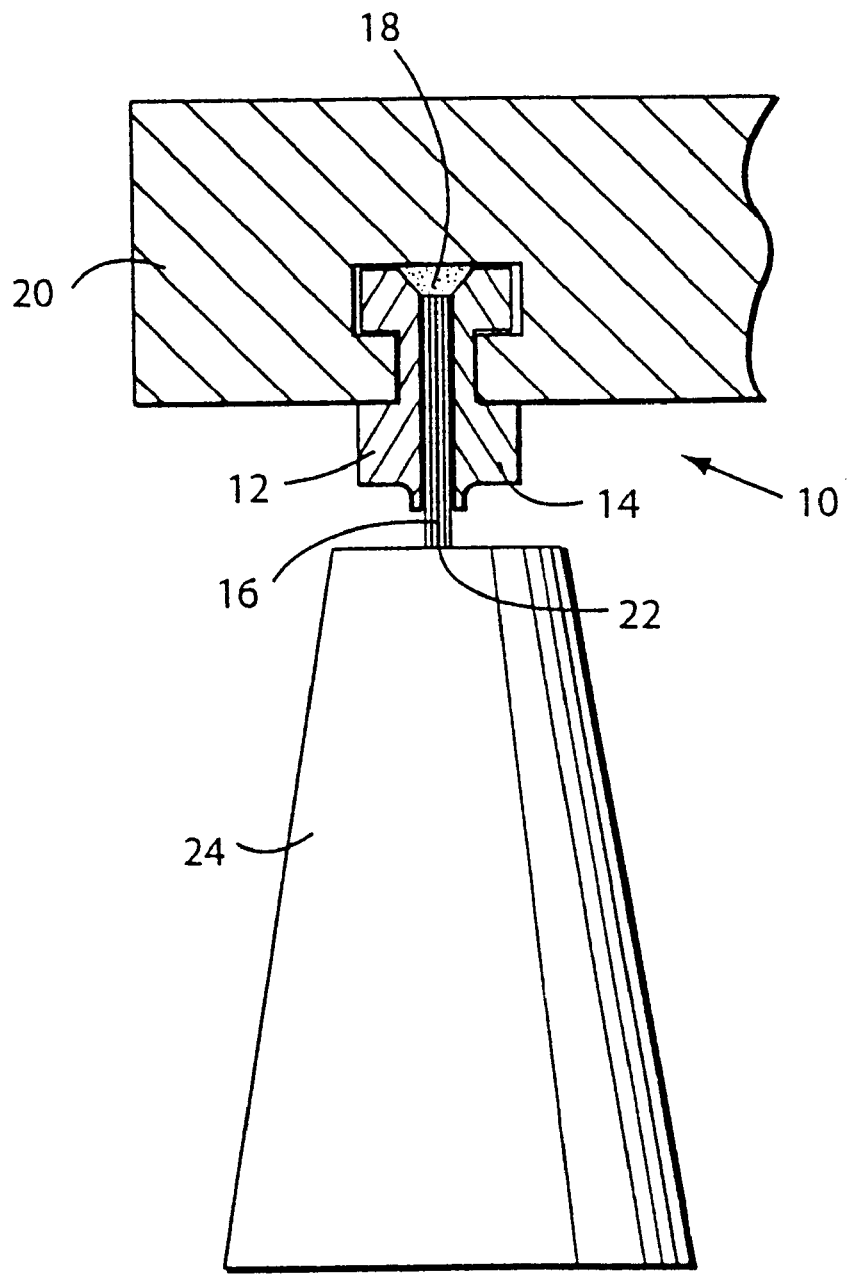
FIG. 1 is a fragmentary cross-sectional view of a prior art brush seal in a shroud of a turbine in sealing relation with a bucket tip cover.

FIG. 1 illustrates an annular brush seal, generally designated 10, constructed in accordance with the prior art. This prior brush seal 10 includes a pair of backing plates 12 and 14 on opposite sides of elongated bristles 16. Backing plates 12 and 14 and the proximal ends of bristles 16 are typically welded together, for example, by a weld 18. Brush seal 10, as illustrated, is mounted to a shroud 20, and bristle tips 22 bear against the covers of buckets 24, effecting a seal therewith. The buckets and brush seal lie in an annular gas flowpath which, at increasingly higher temperatures, may inhibit or prevent use of a brush seal in such high temperature applications.

Figure 2:
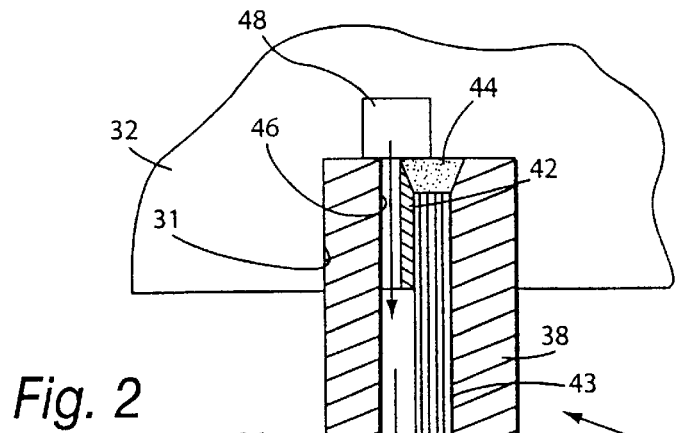
FIG. 2 is an enlarged fragmentary cross-sectional view of a film-cooled high temperature brush seal according to a preferred embodiment of the invention.

FIG. 2, illustrates an annular brush seal, generally designated 30, constructed in accordance with a preferred embodiment of the invention. Brush seal 30 may be mounted in a groove 31 formed in an annular shroud 32 constituting a first stationary component surrounding, and about the axis of, a second rotary component, for example, a bucket 34. The brush seal is provided in a plurality of arcuate segments, e.g., six segments, each extending about 60°. The brush seal also seals between a high pressure region on an upstream side thereof and a lower pressure region on a downstream side thereof. As illustrated, brush seal 30 includes an upstream backing plate 36, a downstream backing plate 38, a plurality of bristles 40 disposed between the backing plates, and a spacer or flange 42 disposed between upstream backing plate 36 and the proximal ends of bristles 40. The bristles are elongated, formed of metal or ceramic materials and disposed in a bristle pack 43. Bristles 40 generally extend at a cant angle relative to the radii of the axis of rotation of buckets 34, for example, a cant angle of about 30–40° in the direction of rotation. Spacer 42 may comprise a flange integral with upstream backing plate 36. As illustrated, a weld 44 maintains the backing plates, spacer and bristles connected one to the other along the radially outermost margin of brush seal 30.

In the apparatus of FIG. 2, a thin film of cooling medium, for example, air, is supplied for flow along the forward surface portion, or face, of the bristle pack 43. The flow is provided by a plurality of circumferentially spaced nozzles 46 formed through spacer 42 or through openings between the spacer and either upstream plate 36 or bristles 40. Nozzles 46 are in communication with a supply or plenum 48 containing the cooling medium. The cooling medium is under pressure and therefore flows through nozzles 46 and along the forward face of bristle pack 43 between the bristle pack and the downstream face of upstream backing plate 36. The cooling medium exits adjacent the juncture of bristle tips 50 and sealing surface 52 of rotating component 34. The flow of cooling medium produces a thin layer of cooling medium that acts as a thermal insulator between the hot gases in the hot gas flowpath, generally indicated by arrows 54, and the bristle pack. The bristles are thus cooled to a temperature well below the temperature of the hot gas stream and below the high temperature limitations of the bristle material. Also, portions of bucket sealing surface 52 are thermally insulated from the hot gas and therefore cooled.

Figure 3:
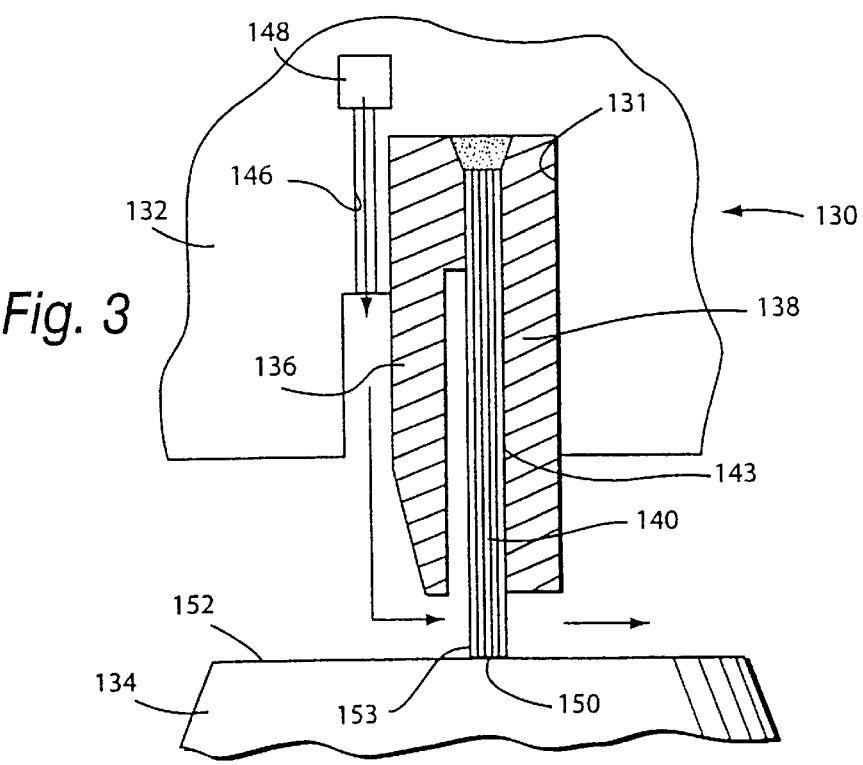
FIGS. 3–6 are views similar to FIG. 2 illustrating further embodiments of the invention.

In FIG. 3, wherein like reference numerals advanced by 100 represent like parts, a brush seal 130 is shown mounted in a groove 131 in a shroud 132. Upstream backing plate 136 is spaced from the forward face of bristle pack 143 containing bristles 140, while downstream backing plate 138 serves to prevent deflection of bristles 140 in an axially downstream direction. In this embodiment, nozzles 146 are provided in shroud 132 and are in communication with a plenum 148 for supplying cooling medium to the nozzles. In this form, jets of cooling medium from the nozzles flow along the upstream surface of upstream backing plate 136 and along and through tips 150 of brush seal 130 in engagement with surface 152 of buckets 134. Thus a thin film of cooling medium is provided along bristle portions 153 adjacent tips 150, thereby effectively thermally insulating such bristle portions from the hot gases of the hot gas path. Surface 152 of rotating component 134 is also cooled by the flow of the cooling medium.

Figures 4, 5:
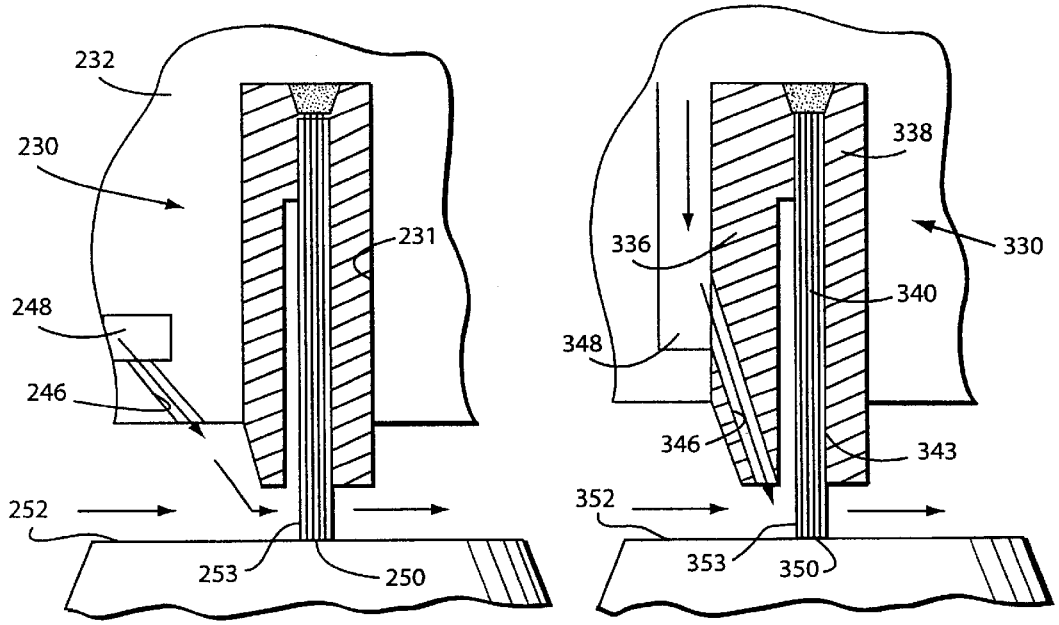

In FIG. 4, wherein like reference numerals advanced by 100 relative to the preceding embodiment are applied to like parts, brush seal 230 is similarly disposed in a groove 231 of a shroud 232. In this form, however, a plurality of circumferentially spaced nozzles 246 are formed in shroud 232 and open at an angle relative to the axis of rotation and into the gas path such that the jets of cooling medium flowing from a supply or plenum 248 are directed to the juncture of bristle tips 250 and sealing surface 252. As illustrated, nozzles 246 are located axially upstream of brush seal 230. A thin film of cooling medium thus flows along portions 253 adjacent tips 250, thereby thermally insulating bristle portions 253 from the hot gases in the flowpath. The cooling medium also flows along surface 252, cooling the bucket portions adjacent the cooling flow.

In FIG. 5, wherein like reference numerals advanced by 100 are applied to like parts, brush seal 330 includes an upstream backing plate 336, a downstream backing plate 338, and a plurality of bristles 340 forming a bristle pack 343 disposed between the plates, the upstream plate 336 being spaced from the forward surface of bristle pack 343. In this form, circumferentially spaced nozzles 346 are angled through the upstream backing plate 336 such that jets of cooling medium flow from the cooling medium supply or plenum 348 through the nozzles 346 directly onto the juncture of bristle tips 350 and sealing surface 352. As in the embodiments discussed above, a thin film of thermally insulating cooling medium is provided along bristle portions 353 adjacent bristle tips 350 and sealing surface 352 of the rotating component.

Figure 6:
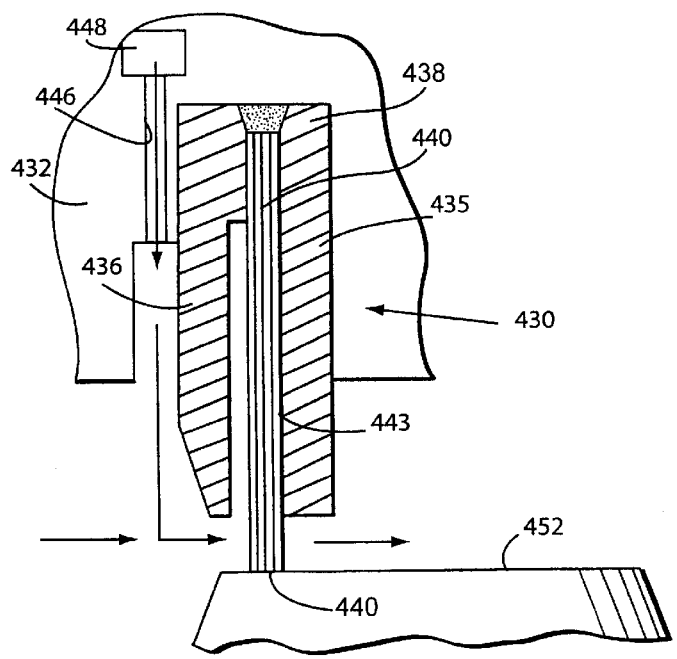

In FIG. 6, wherein like reference numerals advanced by 100 are applied to like parts as in the preceding embodiment, a brush seal 430 includes an upstream backing plate 436, a downstream backing plate 438, and a plurality of bristles 440 forming a bristle pack 443 between the plates. In this form, shroud 432 mounts a plurality of circumferentially spaced nozzles 446 in communication with a plenum 448 for supplying cooling medium through the nozzles. Brush seal 430 of FIG. 6 is similar to the brush seal illustrated in FIG. 3 except that brush seal 430 is situated adjacent an upstream portion of the buckets. In this embodiment, the brush seal reduces the bucket temperature along substantially the entirety of the bucket tip or cover surface 452, thereby increasing bucket life.

It will be appreciated that the brush seal hereof may be employed in other and diverse applications and not necessarily only between a fixed component and a rotating component as specifically described herein. Thus, the brush seal hereof may be used where brush seals have not been previously used, e.g., sealing between irregularly-shaped components in high temperature environments such as between a combustion transition piece and a first-stage inlet nozzle of a turbine.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. Sealing apparatus comprising:
 a first stationary component and a second rotating component movable relative to one another and defining a gap therebetween;
 a brush seal carried by said first stationary component for disposition between the first stationary component and the second rotating component and sealing the gap between high and low pressure regions on respective opposite sides of said seal, said brush seal including a plurality of bristles projecting from said brush seal and having free ends terminating in bristle tips in engagement with said second rotating component and forming a seal between said components to minimize flow of high temperature fluid from the high pressure region through said gap to the low pressure region wherein said brush seal includes first and second backing plates on opposite sides of said bristles, said first backing plate disposed along an upstream side of said bristles and spaced upstream from an upstream surface portion of said bristles; and
 means for forming a thin layer of a cooling medium along a surface portion of said bristles to thermally insulate the bristles from the high temperature fluid.

2. Apparatus according to claim 1 wherein the forming means includes a plurality of nozzles for flowing the cooling medium into the high pressure region and along upstream surface portions of said bristles.

3. Apparatus according to claim 1 wherein said forming means include a plurality of nozzles for flowing the cooling medium between said first backing plate and said upstream surface portion and in a direction toward said second rotating component.

4. Apparatus according to claim 3 wherein said bristles are elongated and said nozzles open into the space between said first backing plate and said elongated bristles adjacent ends of said bristles remote from said bristle tips so as to enable flow of the cooling medium along a majority of the length of said bristles along said upstream surface portion thereof.

5. Apparatus according to claim 1 wherein the forming means includes a plurality of nozzles formed in said first stationary component at a location upstream of said brush seal for flowing the cooling medium into the high pressure region and along the upstream surface portions of said bristles.

6. Apparatus according to claim 1 wherein the forming means include a plurality of nozzles angled for flowing the cooling medium directly toward a juncture of the bristle tips and said second rotating component.

7. Apparatus according to claim 6 wherein said nozzles are carried by said first stationary component upstream of said brush seal.

8. Apparatus according to claim 6 wherein said brush seal includes first and second backing plates on opposite sides of said bristles, said first backing plate disposed along an upstream side of said bristles and spaced upstream from an upstream surface portion of said bristles, said nozzles opening through said first backing plate for flowing the cooling medium along upstream portions of said bristles adjacent said bristle tips.

9. Apparatus according to claim 1 wherein said first and second components include a shroud and bucket tips, respectively, said brush seal being located adjacent an edge of said bucket tips.

10. A rotary machine comprising:
 a rotatable component and a component fixed against rotation, said components disposed about an axis;
 a brush seal carried by one of said components and including a plurality of bristles projecting from said one component and having free ends terminating in bristle tips in engagement with the other of said components to minimize flow of a high temperature fluid from a high pressure region on one side of the brush seal to a low pressure region on an opposite side of said seal, wherein said brush seal includes first and second backing plates on opposite sides of said bristles, said first backing plate disposed along an upstream side of said bristles and spaced upstream from an upstream surface portion of said bristles; and
 a plurality of nozzles carried by said one component for directing a cooling medium in a direction toward a juncture of said bristle tips and said other component to form a layer of cooling medium adjacent a surface of the bristles on said upstream side thereof to thermally insulate the bristles from the fluid.

11. Apparatus according to claim 10 wherein said plurality of nozzles are disposed between said first backing plate and said upstream surface portion of said bristles for flowing the cooling medium between said first backing plate and said upstream surface portion and in a direction toward said rotatable component.

12. Apparatus according to claim 10 wherein said bristles are elongated and said nozzles open into the space between said first backing plate and said elongated bristles adjacent ends of said bristles remote from said bristle tips so as to enable flow of the cooling medium forming the thermal insulating layer along the majority of the length of the bristles along the upstream surface portion thereof.

13. Apparatus according to claim 10 wherein said nozzles are formed in said one component at a location upstream of said brush seal for flowing the cooling medium into the high pressure region and along the upstream surface portions of said bristles.

14. Apparatus according to claim 10 wherein said nozzles are angled for flowing the cooling medium directly toward a juncture of the bristle tips and said second component.

15. Apparatus according to claim 14 wherein said nozzles are carried by said first component upstream of said brush seal.

16. Apparatus according to claim 14 wherein said brush seal includes first and second backing plates on opposite sides of said bristles, said first backing plate disposed along an upstream side of said bristles and spaced upstream from an upstream surface portion of said bristles, said nozzles opening through said first backing plate for flowing the cooling medium along upstream portions of said bristles adjacent said bristle tips.

17. Apparatus according to claim 10 wherein said component fixed against rotation and said rotatable component include a shroud and bucket tips, respectively, said brush seal being located adjacent an edge of said bucket tips.

18. Sealing apparatus comprising:
 first and second components movable relative to one another and defining a gap therebetween;
 a brush seal carried by said first component for disposition between the first component and the second component and sealing the gap between high and low pressure regions on respective opposite sides of said seal, said brush seal including a plurality of bristles projecting from said brush seal and having free ends terminating in bristle tips in engagement with said second component and forming a seal between said components to minimize flow of high temperature fluid from the high pressure region through said gap to the low pressure region; wherein said brush seal includes first and second backing plates on opposite sides of said bristles, said first backing plate disposed along an upstream side of said bristles and spaced upstream from an upstream surface portion of said bristles; and means for forming a thin layer of a cooling medium along a surface portion of said bristles to thermally insulate the bristles from the high temperature fluid, said forming means including a plurality of nozzles angled for flowing said cooling medium directly toward a juncture of said bristle tips and said second component, said nozzles opening through said first backing plate for flowing the cooling medium along upstream portions of said bristles adjacent said bristle tips.

19. A rotary machine comprising:

a rotatable component and a component fixed against rotation, said components disposed about an axis;

a brush seal carried by one of said components and including a plurality of bristles projecting from said one component and having free ends terminating in bristle tips in engagement with the other of said components to minimize flow of a high temperature fluid from a high pressure region on one side of the brush seal to a low pressure region on an opposite side of said seal, wherein said brush seal includes first and second backing plates on opposite sides of said bristles, said first backing plate disposed along an upstream side of said bristles and spaced upstream from an upstream surface portion of said bristles; and a plurality of angled nozzles carried by said one component for directing a cooling medium in a direction toward a juncture of said bristle tips and said other component to form a layer of cooling medium adjacent a surface of the bristles on said upstream side thereof to thermally insulate the bristles from the fluid, said nozzles opening through said first backing plate for flowing the cooling medium along upstream portions of said bristles adjacent said bristle tips.

* * * * *